（12）United States Patent
Cannon

(10) Patent No.: US 7,910,891 B2
(45) Date of Patent: Mar. 22, 2011

(54) METHOD AND APPARATUS FOR PHOTOGRAPHING "SMALL" X-RAY SCINTILLATION IMAGES AT THE SAME("FULL") CAMERA RESOLUTION NORMALLY AVAILABLE FOR "LARGE" SCINTILLATION IMAGES

(76) Inventor: James Edward Cannon, Colorado Spring, CO (US)

( * ) Notice: Subject to any disclaimer, the term of this patent is extended or adjusted under 35 U.S.C. 154(b) by 139 days.

(21) Appl. No.: 12/284,768

(22) Filed: Sep. 24, 2008

(65) Prior Publication Data
US 2010/0072378 A1  Mar. 25, 2010

(51) Int. Cl.
*G01T 1/20* (2006.01)
(52) U.S. Cl. .................................... 250/368
(58) Field of Classification Search .............. 250/368
See application file for complete search history.

(56) References Cited

U.S. PATENT DOCUMENTS 5,142,557 A * 8/1992 Toker et al. ............... 378/37
5,430,287 A * 7/1995 Kusaka ................. 250/201.5
6,353,657 B1 * 3/2002 Bayrock et al. .............. 378/98.3
2006/0278830 A1 * 12/2006 Nishizawa et al. ........ 250/341.1
* cited by examiner

*Primary Examiner* — David P Porta
*Assistant Examiner* — Shun Lee

(57) ABSTRACT

Unused camera pixel locations are recovered when shifting from photographing an x-ray scintillation image of a larger subject to that of a substantially smaller one by using a suitably shorter optical path combined with appropriate changes in focus. The optical path for large subjects involves a first mirror followed by a second mirror. The camera receives light from the second mirror, and is in a fixed and unchanging physical relationship to that second mirror, forming a unitary mirror-camera assembly. To shorten the optical path that unitary assembly is rotated about an axis from a position where it was in the optical path downstream from the first mirror to one where the second mirror is interposed between the scintillation screen and the first mirror, and also such that the camera looks in a different direction along the shortened optical path length. Focus adjustment to accommodate the different optical paths may be accomplished by changing the spacing of elements internal to the lens, or, the entire lens assembly can be moved a bit closer to or further away from the camera body. The scintillation image may be replaced with a glass plate carrying a document illuminated from within a housing carrying the unitary mirror-camera assembly.

10 Claims, 11 Drawing Sheets

X-RAY SYSTEM FOR SMALL OBJECT WITH UNITARY MIRROR-CAMERA ASSEMBLY ROTATED TO BYPASS PRIMARY MIRROR (INTERCEP) THE SCINTILLATION IMAGE)

CONVENTIONAL X-RAY SYSTEM CAMERA HOUSING
FOR USING TWO FIXED MIRRORS AND THAT LACKS
FULL CAMERA RESOLUTION FOR SMALL SUBJECTS

CUTAWAY END VIEW OF THE
CONVENTIONAL X-RAY SYSTEM OF FIG. 1

SINGLE MIRROR SHORT OPTICAL IMAGE PATH ("S") POSITION OF THE UNITARY MIRROR-CAMERA ASSEMBLY FOR SMALL SUBJECTS/TARGETS

X-RAY SYSTEM 14x17 FOR LARGE OBJECT WITH UNITARY MIRROR-CAMERA ASSEMBLY ROTATED TO USE PRIMARY AND SECONDARY MIRRORS

X-RAY SYSTEM FOR SMALL OBJECT WITH UNITARY MIRROR-CAMERA ASSEMBLY ROTATED TO BYPASS PRIMARY MIRROR (INTERCEP) THE SCINTILLATION IMAGE)

UNITARY MIRROR-CAMERA ASSEMBLY

SHOWN IN TABLE, SYSTEM IN 6"x6" POSITION, WITH THE SCINTILLATION SCREEN, TABLE TOP, AND ACTUATOR ARM NOT SHOWN

UNITARY MIRROR-CAMERA FOCUS PUSHROD IN
SMALL 6" x 6" POSITION, TOP VIEW

UNITARY MIRROR-CAMERA FOCUS PUSHROD IN
SMALL 6" x 6" POSITION, SIDE VIEW

UNITARY MIRROR-CAMERA FOCUS PUSHROD IN LARGE POSITION, SIDE VIEW

FULL RESOLUTION PHOTOGRAPHY SYSTEM IN 6"x6" POSITION, WITH ACTUATOR ARM NOT SHOWN

METHOD AND APPARATUS FOR PHOTOGRAPHING "SMALL" X-RAY SCINTILLATION IMAGES AT THE SAME("FULL") CAMERA RESOLUTION NORMALLY AVAILABLE FOR "LARGE" SCINTILLATION IMAGES

INTRODUCTION AND BACKGROUND

Until recently, the usual way of permanently capturing an x-ray image involved the use of a sheet of film. A cassette of material opaque to visible light but not to x-rays is loaded with film sensitive to x-radiation and then positioned close to the object. The placement is along the exit path of the x-rays from the object and normal to a central axis along that path. When the source of x-ray radiation is activated an "x-ray shadow" is created as an exposed image on the film. The exposure is obtained without any intervening lenses. After all suitable preparations and precautions have been taken, including advance determination of the intensity and length of the exposure, the x-ray source is activated, and the film removed and developed. The film negative can then be viewed and interpreted by placing it against a light table.

The use of film as a medium for registering the x-ray image has both advantages and disadvantages. Advantages include simplicity and the ability to make the sheet of film as large as needed (within reason, of course), and that the sheet of film can be shaped to conform to a non-planar surface (e.g. a surface of a welded pipe joint). Disadvantages include the cost of the film and the time and cost of materials needed to develop the film. Since x-ray exposure times are generally longer than those of optical photography, there is always the chance that the image will be blurred by unwanted movement by the subject and that a reshoot will be required. Environmental awareness has also imposed costs: developing the film creates a silver bearing solution that is considered a pollutant if improperly disposed of, and can result in hefty fines.

In certain applications, including those in veterinary and some industrial applications, as well as in many medical applications, there is a trend toward using digital camera techniques to capture the image. In place of creating a large array of sensors responsive to x radiation and directly replacing the film with such an array (some films are as large as 14 by 17 inches) a scintillation screen in an otherwise light-tight environment is placed where the film would ordinarily be. A digital camera assisted by a lens system and having a much smaller array of sensors responsive to visible light then records the visible light image created by the x-rays impinging on the scintillation screen.

In veterinary, as in some medical and industrial settings, taking an x-ray involves placing the subject on a horizontal table where it can be positioned for the desired view, with a minimum of restraint and with the least likelihood of unwanted movement. Since an injured dog or cat may not appreciate having its hind quarters (or other parts) 'squashed flat' for the time needed to set up and then take the x-ray image, animals are often first sedated, and placing them on a horizontal table is often an excellent way to enlist the help of gravity and ensure that they 'stay put.'

The surface of the table is one that is strong enough to hold the subject, can withstand frequent cleaning, is not opaque to x-ray radiation, but is opaque to light of optically visible wavelengths. A suitable source of x-ray radiation is movably mounted above the table, and it is common for a projected image of visible light, perhaps involving a cross-hair or other reticule shape, to allow the technician to best position the pattern of uniform x-ray irradiation onto the desired portion of the subject. Just beneath the table, and within a light-tight environment, is a scintillation screen that will fluoresce to produce a scintillation image according to the varying amounts of x-ray radiation reaching each different location of the scintillation screen. If Fido the dog has a broken bone, it is at this point that it is (or would be, if we implemented the means to do so . . . ) first be visible by inspection of the scintillation image. (So far we have described what is essentially a fluoroscope.) However, to make the scintillation image permanent for subsequent inspection, analysis and future reference, it needs to be captured by a camera sensitive to visible light.

To continue with a particular type of veterinary application, which may be taken as illustrative of the state of affairs, the table of the previous paragraph becomes the top surface (or perhaps another part) of a light-tight cabinet or other enclosure. To capture the scintillation image, a digital camera, which may be of a conventional sort found in commerce, is aimed along an optical axis normal to the scintillation screen and that intersects the anticipated center of the scintillation image. One or more mirrors may be employed in the visual optical path to allow the table to remain at a convenient height. It has been found quite feasible to replace a 14"×17" film cassette with a 14"×17" scintillation screen and photograph that with a digital SLR (Single Lens Reflex) camera whose image sensor is of the 24×36 mm size used to emulate the older traditional negative size of the venerable "35 mm (film) camera" (whether SLR or otherwise). The two aspect ratios are not identical (0.82 for 14×17 and 0.67 for 24×36), so that some minor cropping might occur, but this mis-match in aspect ratio is generally not noticeable, or if it is, will be neither fatal nor objectionable. Cameras having ten megapixels or more have been employed with generally satisfactory results.

This has been an agreeable solution for "large/medium-sized animals" in a veterinary setting where a traditional film cassette of 14"×17" would otherwise be in order, as well as for some human medical applications, such as an x-ray image of an adult's chest. Part of what is meant by "agreeable" in the preceding sentence is that the camera lens settings and x-ray exposure times are practical (i.e., relatively short, lest Fido move whilst the image is being shot, or, at the other extreme, be overdosed with either high intensity or long duration x-radiation), and also that the resulting resolution and other properties of the viewable image are satisfactory. Another part of what is meant by "agreeable" is suitable dynamic range: that the exposure avoids both saturation of, and failure to excite, fluorescence in the scintillation screen, and also correspondingly, that the visible fluorescence neither saturates nor fails to excite the optical sensors in the camera. However, to obtain these agreeable outcomes for large/medium-sized animals the distance from the camera lens to the scintillation screen becomes essentially fixed.

Now suppose that the subject is a "small animal" in a veterinary setting, or in a human medical setting, the imaging of "small" body parts such as hands or feet. Say, that if it were a film set-up, a sheet of, say, 6"×6" film would be used in a suitable cassette (or perhaps 6"×8", etc., as the choice of 6"×6" herein is merely illustrative). Furthermore, we are quite desirous that the x-ray exposure itself (intensity, length of time) conform to accepted standards, and that it not amount to a larger than usual dosage of x-radiation. Unfortunately, certain departures from "agreeable" (problems) attend using the conventional digital camera arrangement described in the preceding two paragraphs. In particular, certain practical circumstances exists that, in conjunction with the strong urge to keep the x-ray exposure/dosage unchanged, precludes moving the camera in closer to the scintillation screen to maintain (essentially) the same number of exposed pixels over the size of the (now smaller) actual visible scintillation image. That is, for a 6"×6" area within the complete 14"×17" area, about $5/6^{th}$ of the total area (or about $4/5^{th}$ of the total area for 6"×8") is 'empty' of any useful information! Accordingly, then, without moving the camera to change the length of the optical path, only about $1/6^{th}$ (or only about $1/5^{th}$ for 6"×8") of the sensors in the camera will "see" what is the desired image: we would be losing potential camera resolution, in that a camera pixel now corresponds to a much larger percentage of the smaller subject. An opportunity for a very desirable potential increase in pixel resolution with which to view and interpret the x-ray image of some pussy cat's hind-quarters has been missed. (Put another way, the same hind-quarters shot of a large dog might be thought to have a good quality of resolution, while the same shot for the cat seems wanting. Roughly speaking, a feature of interest in the dog's radiograph has five times the number of camera pixels as the corresponding feature in the radiograph for the cat.) We shall say that, for the cat, "full" camera resolution has not been obtained. We should like to maintain "full" camera resolution for smaller subjects (that is, have the smaller scintillation image of interest fill, or nearly fill, the entire array of the camera's visual imaging sensors). The contrary notion that we should sacrifice image detail simply because the subject is small seems to us to be very undesirable: equal rights for cats and small rodents (as well as for hands and feet)!

Furthermore, the large percentage of unexposed pixel sensors in the camera's array of optical sensors may disturb the camera's idea of what constitutes a proper optical (visual light) exposure, leading to overexposure of the information that is present. (Suitable exposure for an image having a large dynamic range of intensity is recognized problem for digital cameras, and there are many conventional techniques to deal with this, such as monitoring predefined zones of interest and various types of averaging. All we are suggesting here is that automated exposure monitoring solutions will work better when the image tends to fill the entire array of optical sensors, and that the 6"×6" out of 14"×17" scenario is a genuine one that also complicates even the 'smartest' camera's automatic exposure monitoring task, if such were in use.)

If we could move the camera closer there would still be (on average and for a 6"×6" subject image) only about $1/6^{th}$ the light available for imaging when compared to that available from a fully illuminated 14"×17" image (think in terms of uw/cm$^2$ for light originating at the scintillation screen—the larger scintillation screen produces a larger total amount of light!) However, and as is well known, the uniform omnidirectional nature of the light rays precludes the need to perform an adjustment to the aperture of the camera's lens, although we will most likely need to re-focus the lens. Now, even if the bulk of the camera is, for understandable convenience, outside the light tight environment, the lens assembly itself might not be, the better to prevent damage and other accidental mischief. In and of itself, this lack of easy physical access to the lens need not be a problem nor an inconvenience. On the one hand, for many cameras control over these functions resides at a menu driven user interface rather than on a user applied twisting motion to some knurled external ring on the lens assembly proper. On the other, we shall see that such internal automation of the camera's lens assembly is not required.

So, now we are all set to move the camera in along the optical path, and are prepared even to re-focus it at the new distance. Unfortunately, we have to move it quite a ways (to about 40% of what it was to go from 14"×17" to 6"×6"). Assuming that there is some transport mechanism to actually translate the camera along the optical path, we no more than begin to move it than we run into a rather formidable obstacle: the camera needs to pass through (or even ultimately occupy the position of) one or more of the mirrors used to fold the optical path and keep the table at a convenient height. A zoom lens comes to mind, but upon reflection we appreciate that its use requires alteration of the x-ray exposure to accommodate a longer optical exposure, and is therefor not a desirable solution. It also represents a significant expense, as well as an additional operational complexity that can contribute to error.

Still, we lust after the shorter optical path for "smaller" subjects, and its promise of maintaining "full" camera resolution in photographing the final scintillation image. What to do?

Simplified Description of a Preferred Embodiment

A solution to the problem of recovering unused camera pixel locations when shifting from photographing an x-ray scintillation image of a larger subject to that of a substantially smaller one (i.e., maintaining "full" camera resolution) is to produce a suitably shorter optical path combined with appropriate changes to the focus for the camera. The optical path for a large subject involves a primary, or first, mirror followed by a secondary, or second mirror. The camera receives light from the secondary mirror, and is in a fixed and unchanging physical relationship to that secondary mirror. That is, the secondary mirror and the body of the camera form a unitary mirror-camera assembly. Through the use of an axis of rotation the unitary mirror-camera assembly is movable in a single motion from a position where it was in the optical path downstream from the primary mirror (for large subjects) to one where it is interposed between the scintillation screen and the first ("old primary") mirror. In this interposed position (for small subjects) the second ("old secondary") mirror now functions as a "new primary" mirror much closer to the scintillation screen, and produces the desired shorter optical path length needed to maintain "full" camera resolution with small subjects. In a preferred embodiment the unitary mirror-camera assembly rotates about an axis at right angles to the original two-mirror optical axis at the camera, and parallel to the longer edge (or boundary) of the rectangular scintillation imaging area of the scintillation screen. Subsequently then, the camera "looks" in a different direction than before, as the secondary mirror (the "mirror" portion of the mirror-camera unitary assembly) has moved to perform an early interception of light and send it directly to the lens of the camera. The folded optical path now in use has one less mirror than before (what used to be the primary mirror is now dormant and no longer in use—although it may remain unmoved in its original place, for which we are indeed very grateful), and the camera is now accordingly "closer" than before, as the (old) secondary mirror now functions as a (new) primary mirror.

There remains the issue of adjusting the focus to accommodate the shorter optical path. This may be accomplished in one of at least two ways. First, the two optical path lengths may themselves be adjusted such that a focusing ring on the lens which changes the spacing of elements within the lens can be turned from "lock to lock" (i.e., all the way in one direction corresponds to the 14"×17" focus, while all the way in the opposing direction corresponds to the 6"×6" focus). This approach may compromise slightly in the area of maintaining the greatest "full" camera resolution, but the reduction is apt to be slight. Second, the native focusing mechanism of the lens assembly can be fitted with stops to allow adjustable "lock-to-lock" operation with particular optical path lengths selected to obtain the best "full" camera resolution. Third, the internal relationship between the various lens elements internal to the lens assembly can be left undisturbed, and the entire lens assembly can be moved a bit closer to, or further away from, the camera body.

In this third method the camera body is indeed in a fixed relation to the mirror, but the lens is on a slide (itself part of the unitary assembly), allowing the entire lens to move about ½" farther away from the camera body for the 6"×6" field. Similar to the focus ring "locks" of the first and second ways, the slide has two stops: push the lens one way along the slide until it stops for the 14"×17" focus, and push it the other way for the 6"×6" focus. In such an embodiment the stops may be opposing set screws axially aligned along a path parallel to the slide and which interfere with a tab protruding from the side of the lens; focus is set by a 'permanent' adjustment of the set screw ends along the parallel path and which "contain" the path of the tab.

In another embodiment a rail parallel to the slide may carry moveable stops that constrain (are hit by the sides of the tab on the lens) the movement of the lens along the slide. As the mirror-camera unitary assembly is rotated another mechanism urges the lens along the slide. That mechanism is preferably of a resilient nature that attempts some slight over travel, while gracefully allowing the stopping of the actual lens travel at the proper location for each focus position.

In either embodiment where the lens assembly is on a slide, an additional embodiment is possible where a combination of a push rod and springs moves the lens assembly to appropriate positions relative to the camera body as the unitary mirror-camera assembly is rotated from one position to the other.

DETAILED DESCRIPTION

Figure 1:
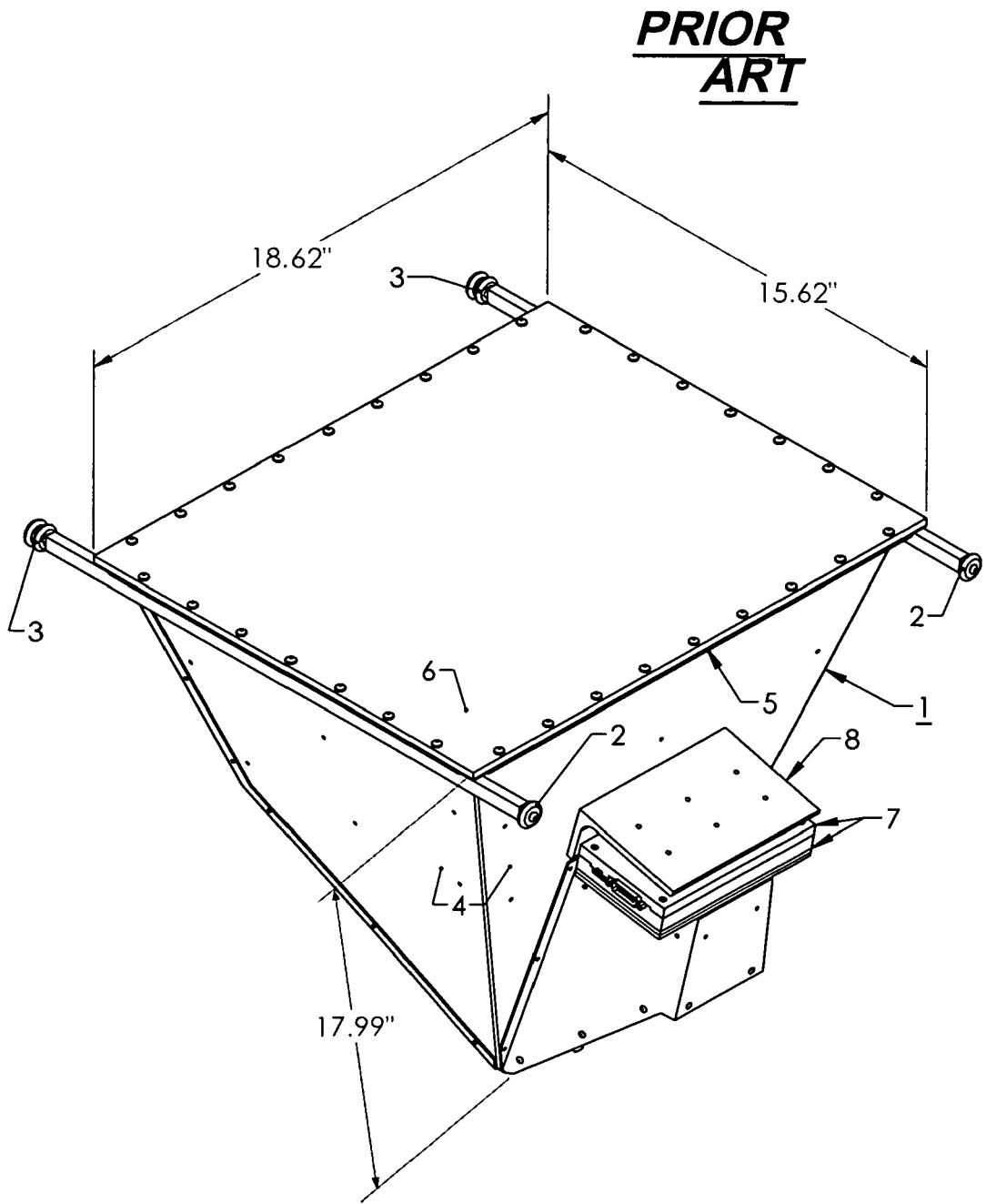
FIG. 1 is a perspective view of a prior art apparatus for photographing a scintillation image formed by x-rays.

Refer now to FIG. 1, wherein is shown a simplified representation 1 of a conventional camera housing used in a veterinary setting. The prior art camera housing 1 is of the sort that uses two fixed mirrors, whose location and orientation are obscured in this view by the outer housing sides 4 and the top cover 6, but which will become clear in connection with FIG. 2. The sides 4 and top cover 6 provide a light-tight enclosure. A digital camera 7 is protected from x-rays by a shield 8. A scintillation screen 5 is located beneath the top cover 6, and its scintillation image (not shown) is what is photographed by the camera 7. This conventional arrangement has a fixed optical path between the camera 7 and the scintillation screen 5, and in the absence of a zoom lens, or changing lenses, the smaller the target or subject (not shown), the smaller will be the image photographed by the camera. That is, the camera housing and camera arrangement shown in FIG. 1 lacks the ability to maintain full camera resolution for small subjects.

Before leaving FIG. 1, however, note the pairs of rollers 2 and 3. These run in tracks that are part of a cabinet, or table (not shown in FIG. 1, but briefly see FIGS. 2 and 7 to appreciate the arrangement) that also includes a work surface/table top, which supports the subject or target to be x-rayed and which occupies a plane just above that of top cover 6. The idea is that the subject or target is placed on the work surface/table top, after which the camera housing 1 can be translated back and forth to afford the best view. We haven't shown it, but it will be readily appreciated that the x-ray source itself can be moveable and mechanically coupled to the camera housing, so that it translates at the same time and by the same amount, thus keeping the x-ray irradiation centered on the center of the scintillation screen (which is presumably also where the camera 7 is aimed). A projected cross hair or other symbol of visible light originating at the x-ray source may fall on the subject, the better to allow the operator to tell just what part of Fido he or she is about to x-ray.

Figure 2:
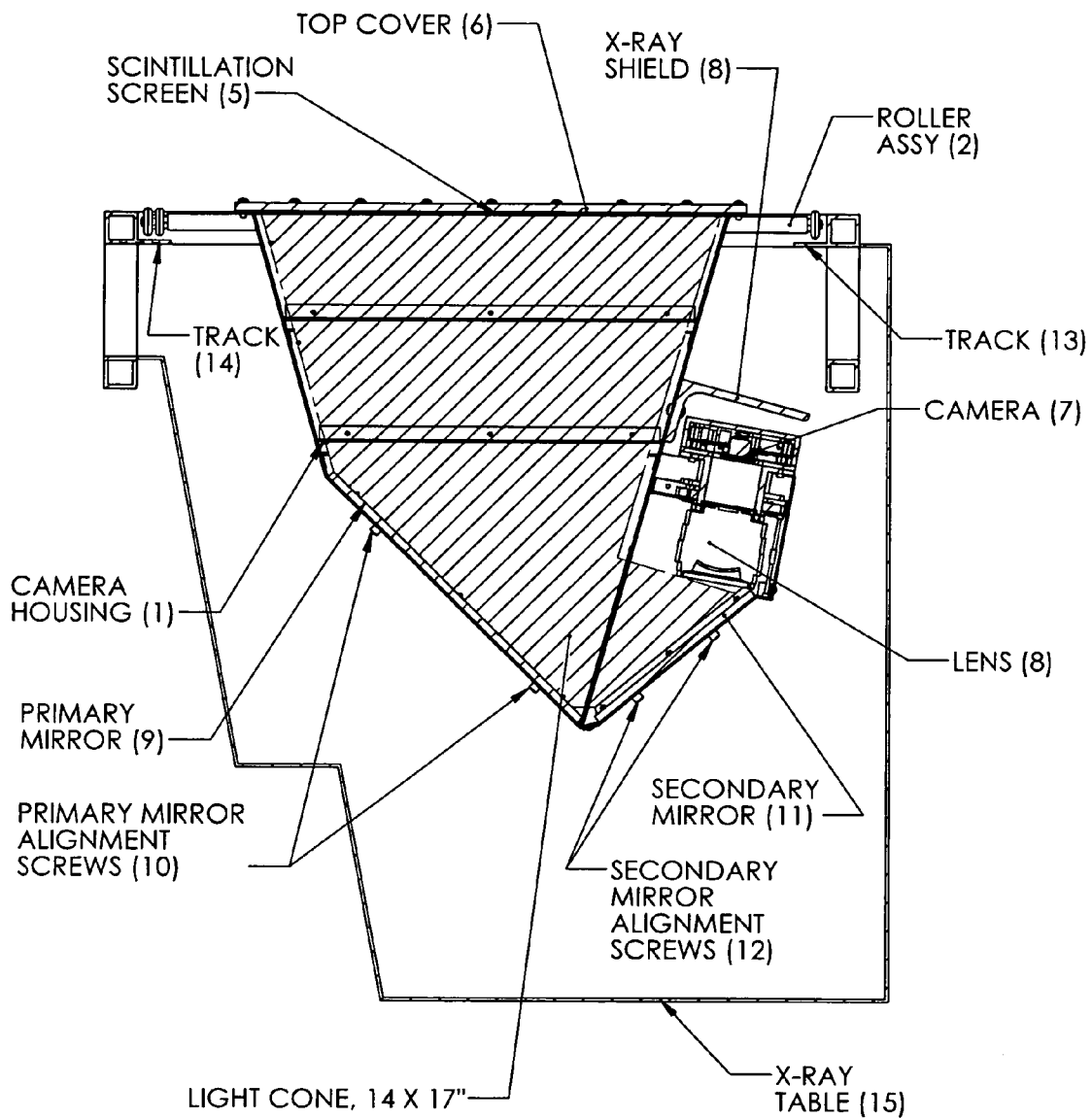
FIG. 2 is a cut-away side view of the prior art apparatus of FIG. 1, and illustrates how it uses primary and secondary mirrors.

Refer now to FIG. 2, wherein is shown a cut-away side view of the conventional prior art camera housing 1 of FIG. 1, as located in a standard veterinary cabinet, or x-ray table (15). Note the track 13 that rollers 2 and the track 14 that rollers 3 operate in. Also note the camera 7 and its lens 8. They "look into" a secondary mirror 11 aligned by screws 12 to correctly re-reflect into the lens and camera the scintillation image reflected by a primary mirror 9. The primary mirror 9 creates a reflected scintillation image from the (original) scintillation image (not shown) appearing on the underside of the scintillation screen 5, according to the x-rays reaching it. An array of alignment screws 10 allows the precise angular adjustment of the primary mirror. It terms of the description that follows for the remaining figures, we would term the optical path used by the prior art of FIGS. 1 and 2 as "long" and for use with a "large" subject or target, and note that it does not afford "full" camera resolution when used with "small" subjects or targets.

Figure 3A:
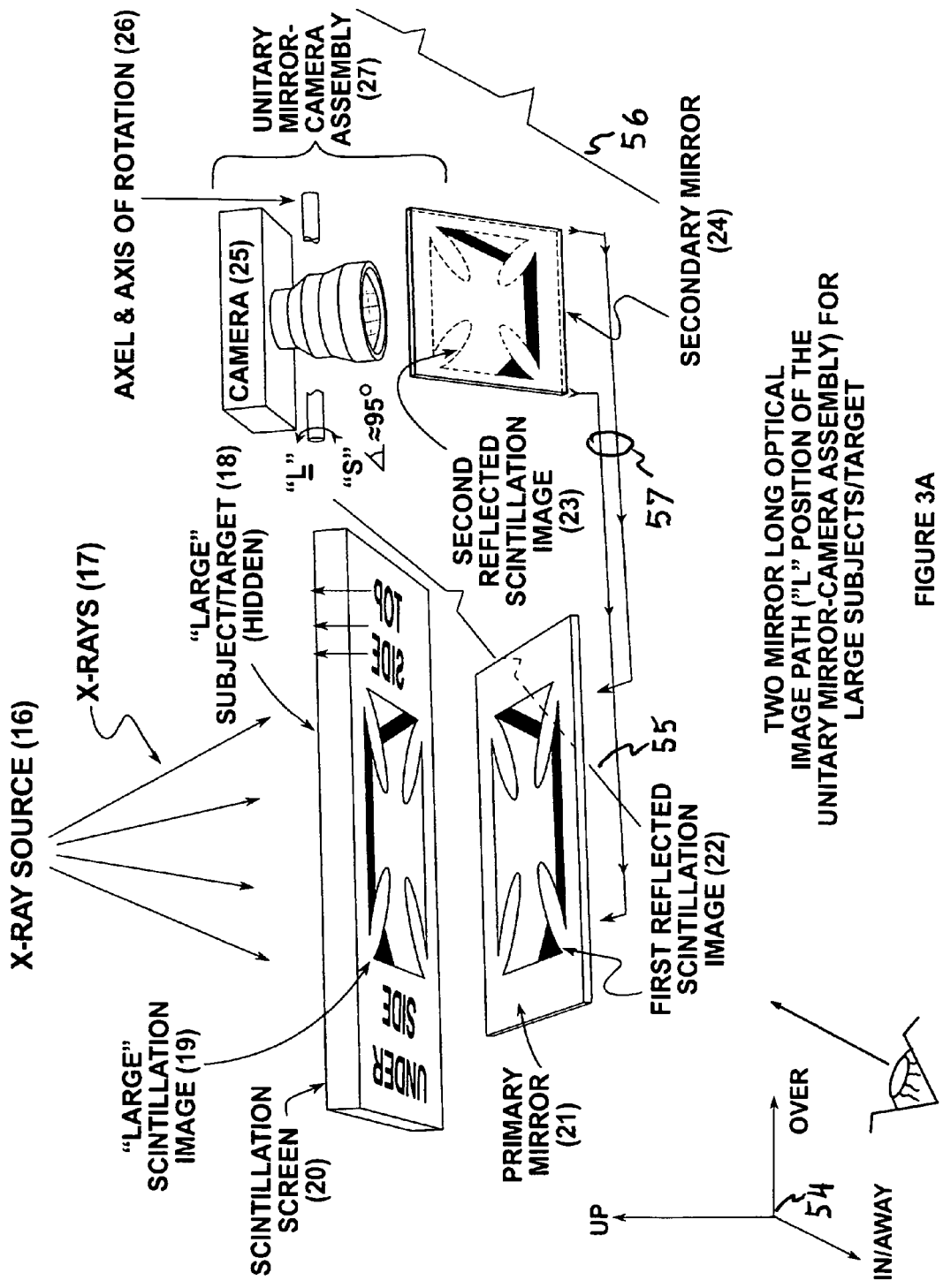
FIG. 3A is a simplified perspective exploded view illustrating the principles of an apparatus and its method for performing a two mirror long optical image path for large subjects/targets, and which can also be configured as shown in FIG. 3B.
Figure 3B:
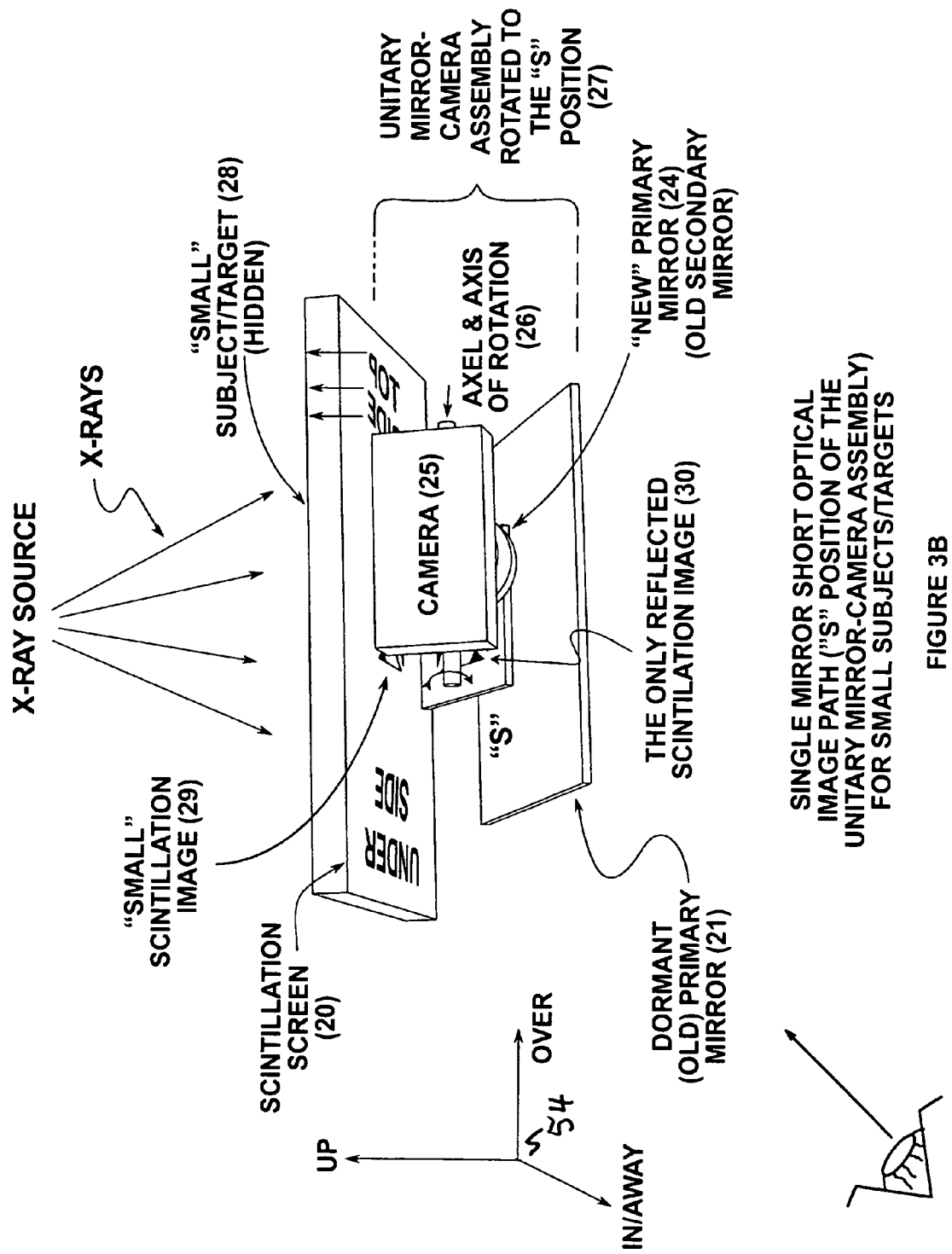
FIG. 3B is a simplified perspective non-exploded view further illustrating the principles of the apparatus of FIG. 3A, and of its method for performing a single mirror short optical image path for small subjects/targets.

Refer now to FIG. 3A, wherein is shown a partial perspective and partially exploded view of a "long" optical path arrangement of two mirrors with a lens and camera that, while it will accomplish the same photography as is possible with the prior art arrangement of FIGS. 1 and 2, will also easily re-configure (as in FIG. 3B) to have a single mirror and a "short" optical path that does allow for "full" camera resolution for small subjects/targets. FIG. 3A, and its companion, FIG. 3B, are not offered as true pictorial representations, although, the shapes shown for the various elements actually are suggestive of their real counterparts. These particular figures are somewhat simplified and offered with the expectation that they will produce a rapid appreciation of "how it works."

In particular then, let's begin with the scintillation screen 20. It may be a sheet of glass, or perhaps of aluminum, whose underside has received a coating of a suitable phosphor material (not shown). An x-ray source 16 (not separately shown, either) produces, when activated, a cone-like region of suitable x-rays 17 that are impeded by a (in this example) "large" subject/target 18 (that owing to the nature of the view [see orientation arrows 54] is hidden behind the tilted scintillation screen 20). The resulting x-ray shadow 19 is what we have termed a scintillation image, and which in this example is also a "large" scintillation image (because the target is "large" and the image 19 is nearly identical in size as the target). Primary mirror 21 produces a first reflected scintillation image 22, that is in turn re-reflected by a secondary mirror 24. The secondary mirror 24 produces a second reflected scintillation image 23 that travels into a camera (and lens) 25, where it is in due course photographed pursuant to commands or instructions from an operator. It is now appropriate to point out two things: First, for clarity the view in FIG. 3A is an exploded one, as indicated by jagged reference lines 55 and 56. The horizontal distance apart of these lines is to be understood as the amount that the secondary mirror 24 and the camera (with its lens, too) have been "exploded" away from the other elements, such as primary mirror 21. In this connection, lines 57 show the path that the secondary mirror 24 and the camera 25 would take to "undo" the explosion. Second, as indicated by the legend in the figure, the camera 25 (along with its lens) and the secondary mirror comprise what we have termed a "unitary mirror-camera assembly" 27. That is, (and how this is accomplished is shown in later figures, such as FIG. 6, among others), the camera 25 and the secondary mirror 24 are in a fixed physical and spatial relation to each other, as though they were one thing. That is, together they are a unitary assembly. As a unitary assembly they can be moved relative to other items (e.g., the scintillation screen 20), as for example, in a manner that can be produced by an axle and its axis of rotation 26.

Indeed, the unitary mirror-camera assembly is, in a preferred embodiment, supported by the axle 26. For the view shown in FIG. 3A the axle/camera/secondary mirror are where they are because the axle 26 has been rotated about its axis from another possible position "S" (the subject of FIG. 3B) until it is as shown, in position "L" (which stands for "LARGE" while "S" stands for "SMALL"). It will be appreciated that the optical path of the arrangement shown in FIG. 3A is the same, or nearly so, as for FIG. 2. In fact, we may say that the primary mirror 21 of FIG. 3A corresponds to the primary 9 of FIG. 2, and that the secondary mirror 24 of FIG. 3A corresponds to the secondary mirror 11 of FIG. 2. So, when the axle 26 is rotated to the position "L" as shown, the system of FIG. 3A operates in essentially the same manner as does the one of FIGS. 1 and 2. That is, the entire "large" scintillation image 19 is conveyed (in two sequential reflections) to the camera 25 for "full" camera resolution, and that entire image might represent a target 18 as large as 14"×17" in size.

The situation changes abruptly, however, when we consider the arrangement shown in FIG. 3B. There is depicted the same apparatus as was shown in FIG. 3A, save that now the axle 26 has been rotated through approximately ninety-five degrees) (95° to the "S" position, and a "small" subject/target 28 (not visible) has replaced the "large" target 18 of FIG. 3A. As can be seen from an inspection of FIG. 3B, the mirror 24 that was the secondary mirror has now been moved into a position where it intercepts the "small" scintillation image 29 before it reaches the (old) primary mirror 21. That is, the mirror 24 is now functioning a "new" primary mirror. Although the target 28 is "small" the smaller mirror 24 is nevertheless large enough to reflect an entire "small" scintillation image 29, even when it represents a target that is 6"×6" in size. Since the mirror 24 and the camera are each part of the same unitary mirror-camera assembly 27, the optical path length leading to the camera has been drastically reduced, allowing "full" camera resolution.

Figure 4:
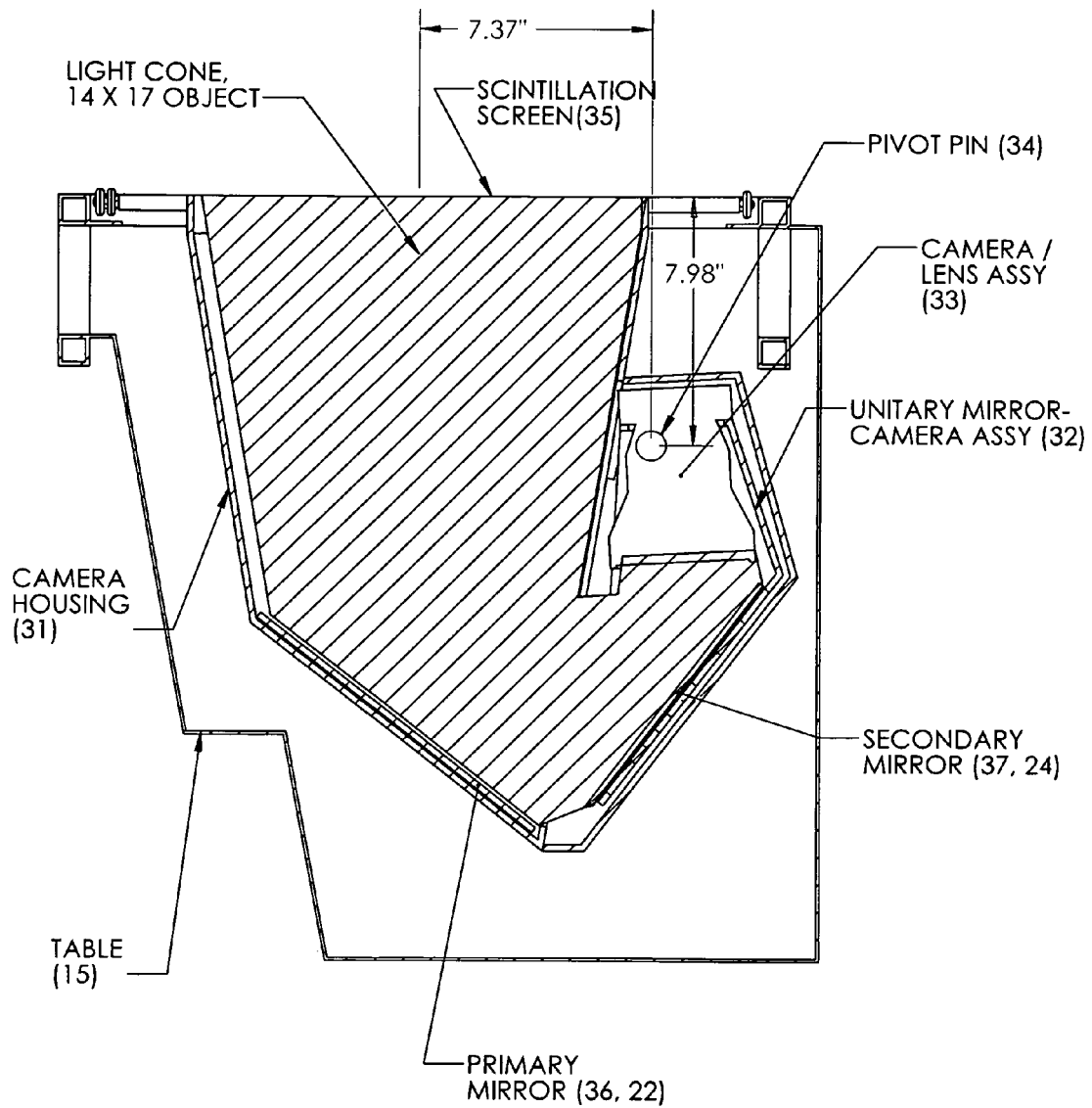
FIG. 4 is a simplified diagram illustrating a cut-away end view of an actual apparatus similar to FIGS. 3A and 3B configured to allow the camera to capture a "full" resolution view of a large scintillation image while using a long optical path obtained through a primary mirror.

Refer now to FIG. 4, wherein is shown a cut-away side view of a camera housing 31 constructed in accordance with what is shown in FIGS. 3A and 3B, but configured to operate in the manner that FIG. 3A depicts. At the top of the figure is the scintillation screen 35. A primary mirror (36, 22) reflects any scintillation image on the screen 35 onto secondary mirror (37, 24), from whence the re-reflected scintillation image is seen by the camera/lens assembly 33, which is part of the unitary mirror/camera assembly 32. Finally, note the pivot pin 34; in terms of the description given for FIG. 3A, pivot pin 34 is the axle 26 and is in the "L" position. In view of the foregoing and the explanation given for FIG. 3A, it is believed that further remarks about FIG. 4 are unnecessary.

Figure 5:
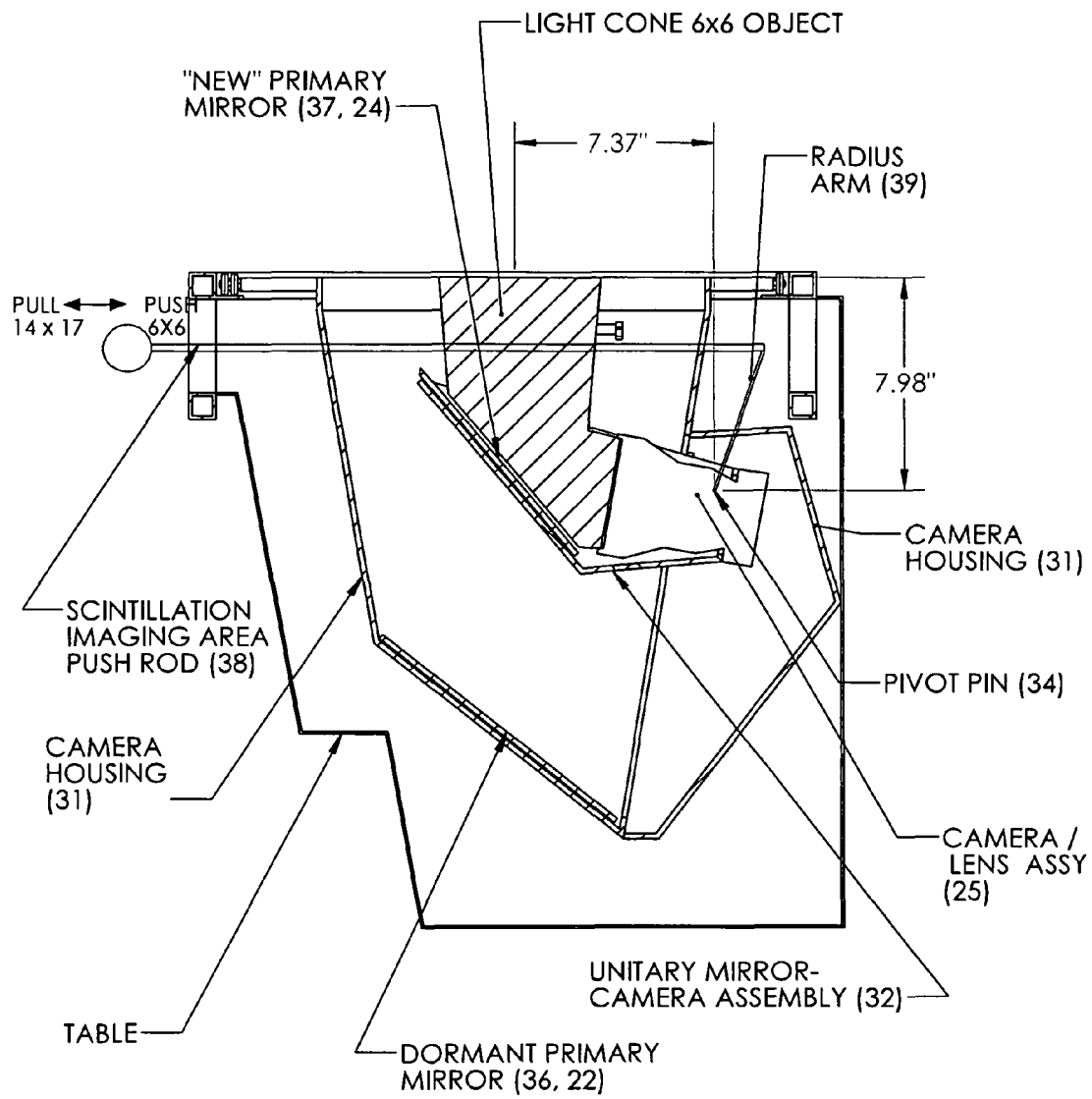
FIG. 5 is a simplified diagram illustrating a cut-away side view of the actual apparatus of FIG. 4, and that is similar to FIGS. 3A and 3B, configured to continue to produce "full" resolution camera images of small scintillation images through the use of a unitary mirror-camera assembly that is rotated to intercept the scintillation image before it reaches the primary mirror, thus allowing the (old) secondary mirror to function as a (new) primary mirror and by thus producing an optical path length shorter than is possible when the (old) primary mirror remains in use.

Refer now to FIG. 5, which is a cut-away side view of the same camera housing 31 as was shown in FIG. 4, except that now the pivot pin 34 (or axle 26) has been rotated to the "S" position to produce a shorter optical path (as in FIG. 3B) using only one mirror. That is, the (old) primary mirror (36, 22) is now dormant. The old secondary mirror is now the "new" primary mirror (37, 24), and in its rotated position intercepts the (now presumably) smaller scintillation image (not shown) before it reaches the old mirror (36, 22).

Now, to be sure, this notion of large and small subjects/targets is one that depends heavily on the operator's intent. The target might indeed BE small (e.g., a kitten with a suspected dislocation), or, it might be the right front "wrist" of a rather large dog who accidentally slid legs first into a wall with significant force, and now walks with a pronounced right front side limp. In this latter case, there is likely to be a lot of "the-rest-of-the-dog" scintillation image created on the scintillation screen, but it is not of interest. That part of the entire scintillation image that corresponds to just the right wrist will be intercepted by the "new" primary mirror (37, 24) and is the scintillation imaging area selected by the translated location of the camera housing/x-ray source. That translation is performed by the operator, and is relative to where Fido lays on the table with his right front leg strapped down so that it won't move. This selected scintillation imaging area is what will be photographed at "full" camera resolution.

It will be clear, then, that FIG. 5 corresponds to the single mirror, short optical path, arrangement depicted in FIG. 3B. It will readily be appreciated that this circumstance has been produced by tipping, or rotating, the unitary mirror-camera assembly 32 about 95° clockwise, relative to where it was in FIG. 4.

That said, there IS some additional stuff shown in FIG. 5 that, (for clarity and in sympathy with the notion of 'one step at a time') has not appeared thus far in the figures. In particular, we now show a preferred (because of its simplicity and ease of use) way to produce the rotation of the unitary mirror-camera assembly 32 about the pivot pin 34 and between the "L" position (FIGS. 3A & 4) and the "S" position (FIGS. 3B & 5). That mechanism involves a scintillation imaging area push rod 38 coupled at a distal end to one end of a radius arm 39 that is coupled at its other end to the pivot pin 34 (axle and axis of rotation 26). It is clear, then, that to produce the single mirror circumstances/configuration shown in FIG. 5, the scintillation imaging area push rod 38 has been pushed "IN," while pulling it "OUT" would create the two-mirror circumstances/configuration shown in FIG. 4.

Figure 6:
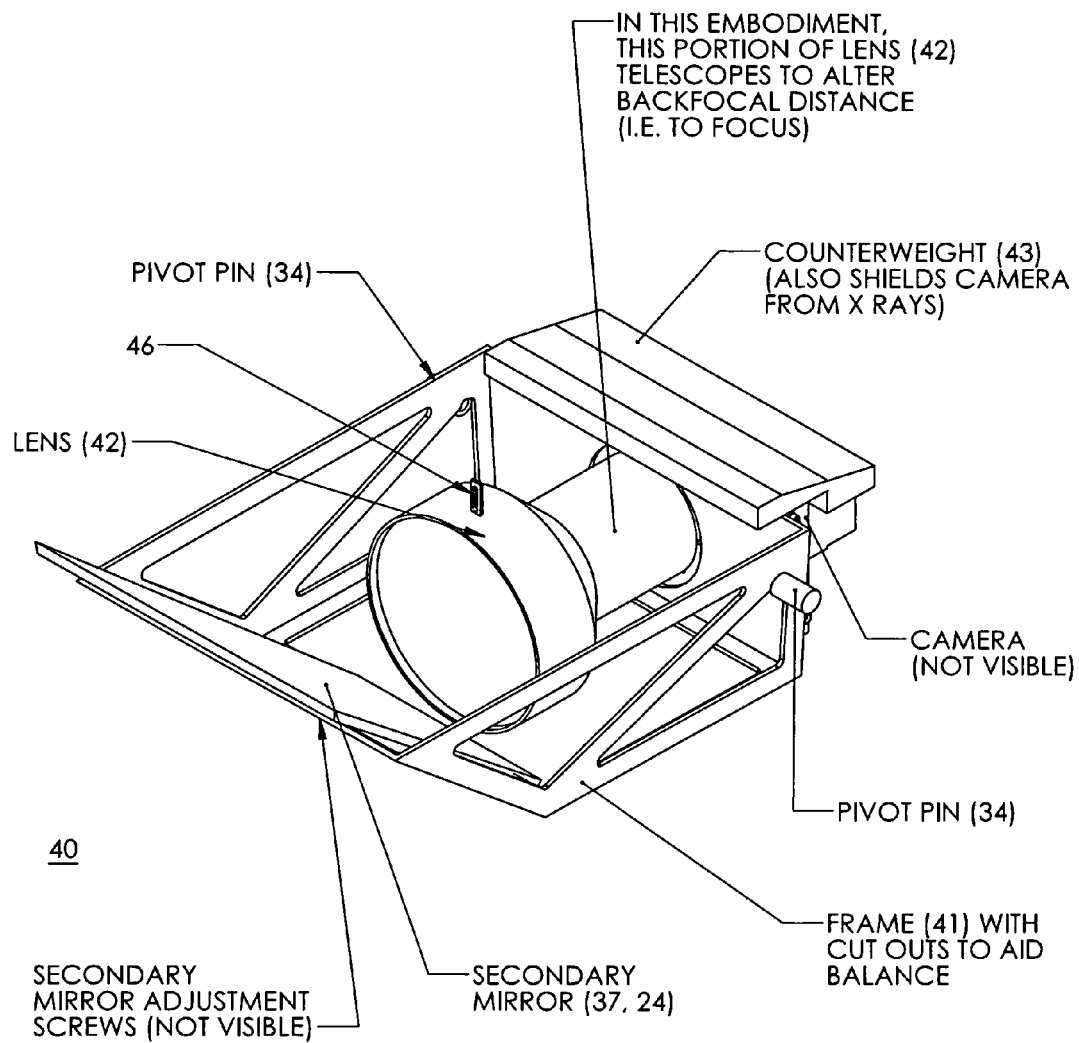
FIG. 6 is a simplified perspective view of the unitary secondary mirror-camera assembly of FIGS. 3A, 3B, 4 and 5.

Now consider the unitary mirror-camera assembly 40 shown in FIG. 6. Note that a frame 41 carries the mirror (37, 24), the lens 42 and the camera. The whole assembly 40 can rotate around pivot pins 34, which themselves are carried by the camera housing (see FIG. 8B or 8C). A counterweight 43 helps balance the weight of the lens (as do cut-outs in the frame 41), while also shielding the camera from x-rays.

Recall that re-focusing of the camera/lens combination is necessary when switching between the "L" and "S" positions. In one embodiment represented by FIG. 6 this change in focus is obtained by a sliding motion of the lens 42 back and forth along the optical axis; that is, aside from the rotation, the camera and frame stay put, while the lens 46 moves, perhaps a few tenths of an inch toward or away from the camera body, via a telescoping sleeve equipped with adjustable stops. In connection with this movement, note tab 46. We shall return to it during the discussion of FIGS. 8A-C.

Figure 7:
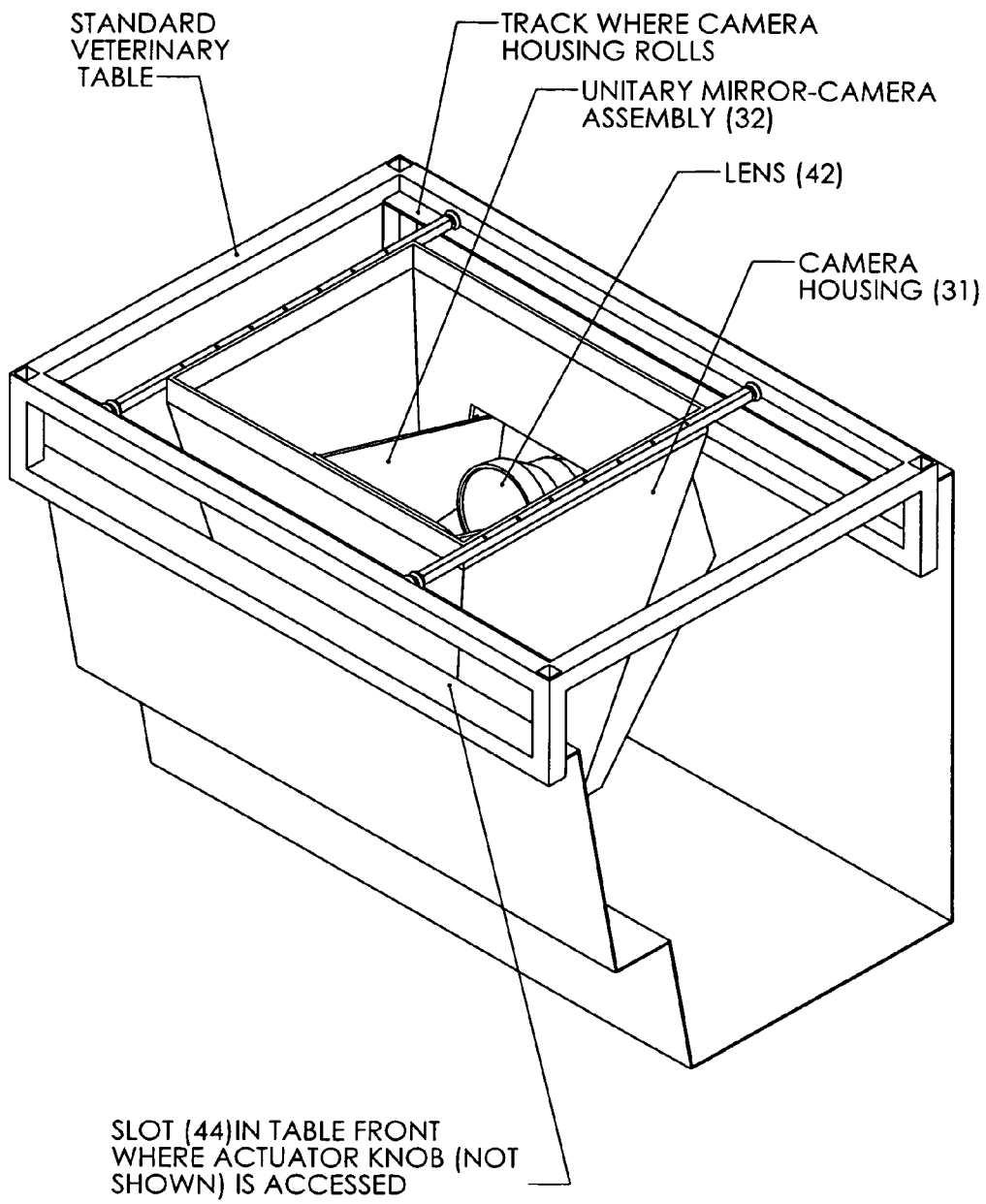
FIG. 7 is a perspective partial view of a standard veterinary x-ray table into which has been installed a camera housing containing the unitary mirror-camera assembly of FIG. 6.

Meanwhile, refer now briefly to FIG. 7. Here is shown a perspective view of a standard veterinary table with its top/work surface removed and nearest end removed, the better to see how the camera housing 31 translates back and forth via rollers and associated tracks. For clarity, the cover and scintillation screen of the camera housing have also been removed, which allows the rotatable unitary mirror-camera assembly 32 to be visible. In this view it is shown in the "S" position. Note also the slot 44 in the front of the table. It is from within slot 44 that the scintillation imaging area push rod 38 and its knob extend outward (refer back to FIG. 5) and also translate back and forth in concert with translation of the camera housing 31. The translation of rod 38 and its knob is easily appreciated, since the scintillation imaging area push rod 38 is coupled to the rotatable unitary camera-lens assembly 32, which itself is carried by the camera housing 31 as it translates back and forth, as needed.

Figure 8A:
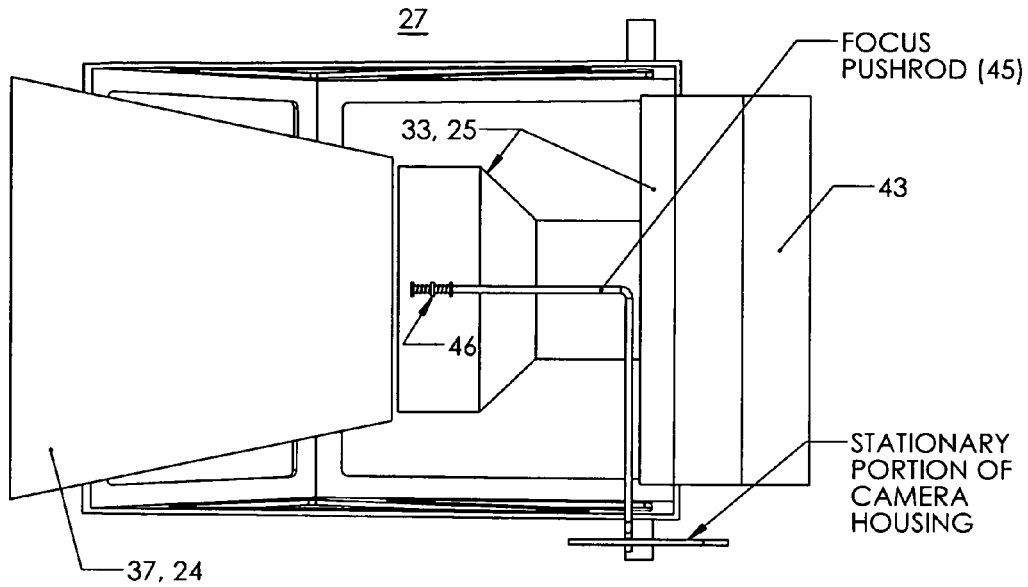
FIGS. 8A, 8B and 8C are various views illustrating the operation of a focus push rod used to focus the lens of the camera for the unitary mirror-camera assembly.
Figure 8B:
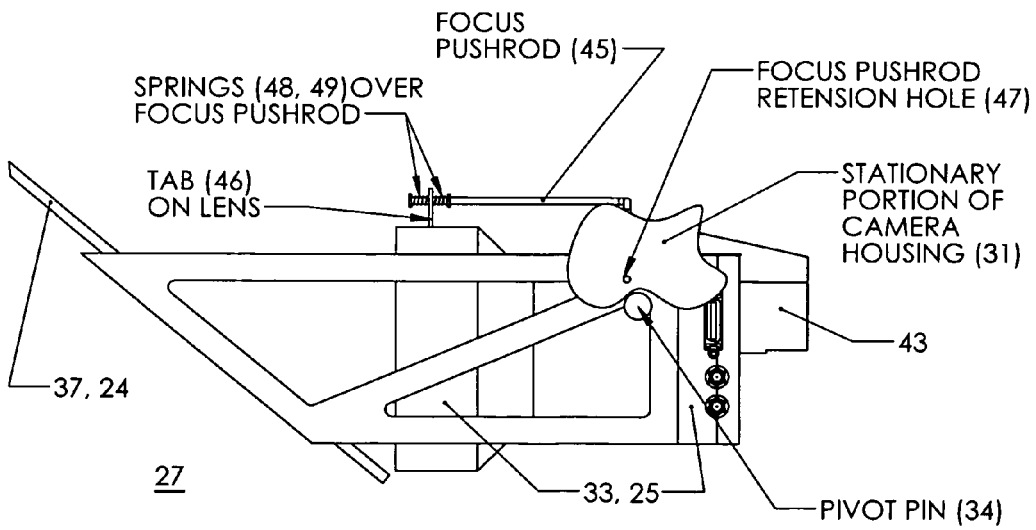
Figure 8C:
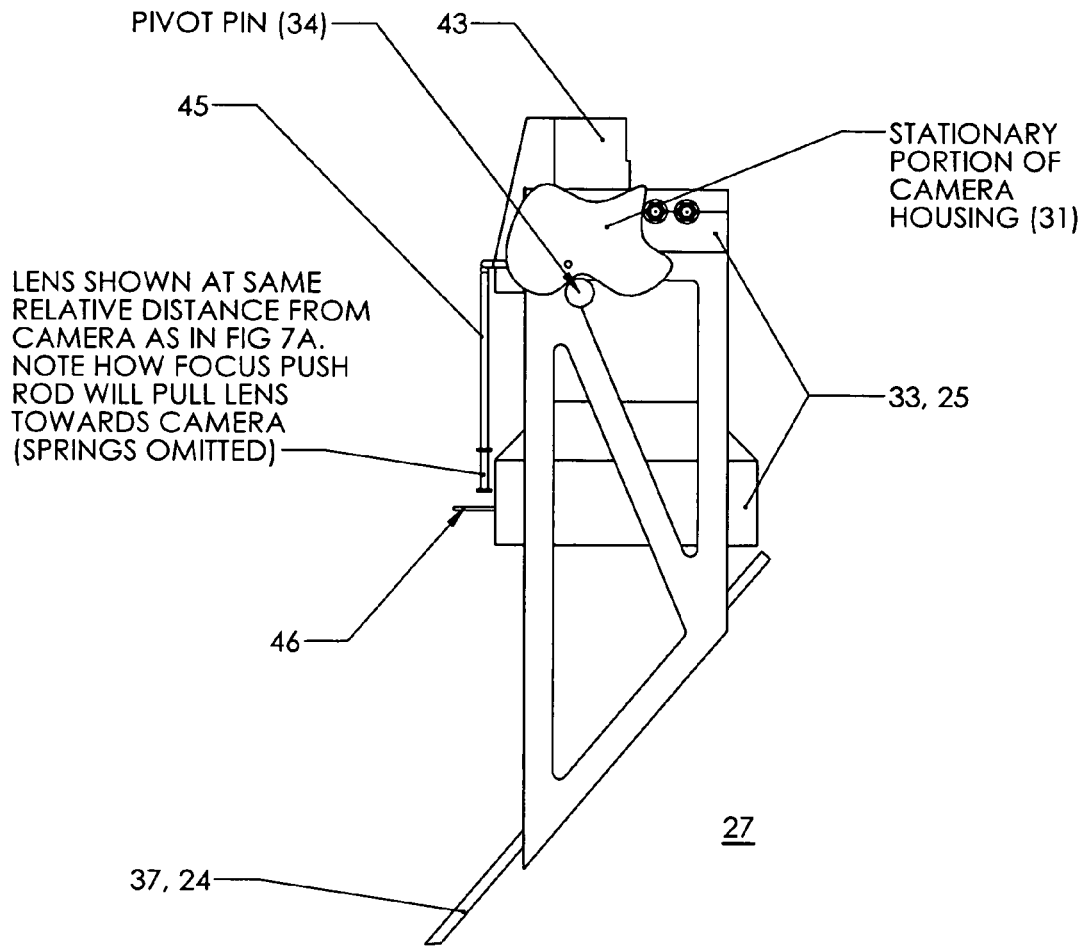

Now refer to FIG. 8A, which is a top view of the unitary mirror-camera assembly 27. Note that one end of the pivot pin/axle is shown as being carried by a portion of the camera housing 31 (see also FIGS. 8B and 8C). The other end of the axle is also carried by the other side of the camera housing, although this has not been shown to avoid cluttering the drawings. What is most of interest in FIGS. 8A-8C is how a focus push rod 45 cooperates with the tab 46, telescoping lens mount, and an eccentric coupling to the camera housing at a location different from where the pivot pin or axle is carried by the camera housing. See the focus push rod retention hole 47 in FIG. 8B.

Switching now to FIG. 8B, two things are apparent after considering FIGS. 8A and 8B. First, consider captive springs 48 and 49. They are essentially a resilient centering mechanism, in that the opposing ends of the two springs encounter a "wide spot" or other retainer (e.g., an E-ring carried by an annular grove along the push rod 45), forcing the tab 46 to "find the center" of the opposing (spring) forces acting on it. Now, the tab 46 is rigidly affixed to the lens, and does not move, save that it is on the telescoping lens, which does move. So, if the rod 45 moves one way along the axis of telescoping, it will take the lens with it, up to the point where the stop in the telescope is encountered. Similarly so, in the case where the push rod 45 moves in the other direction. What the springs 48 and 49 do is allow the push rod 45 to continue to move slightly more that the lens actually telescopes. This makes for positive but "gentle" forcing of the lens into its two extreme (terminal) positions, as determined by the telescope's stops (not shown). Those stops are initially adjusted to put the lens/camera into focus for the "L" position (one extreme) and the "S" position (the other extreme). Second, it is the case that push rod 45 moves back and forth in a direction that is parallel to the axis of the lens' telescoping action. See FIG. 8A. How much it moves is determined by the degree of eccentricity at its coupling to the side wall of the camera housing 31. That is, how far is the retention hole 47 from the center of the pivot pin 34.

In FIGS. 8A and 8B the unitary mirror-camera assembly 27 is shown in the "S" position (the lens is pushed by rod 45 toward the mirror (37, 24)). In FIG. 8C the unitary mirror-camera assembly is shown in the "L" position (the lens is pushed by rod 45 away from the mirror (37, 24)).

Figure 9:
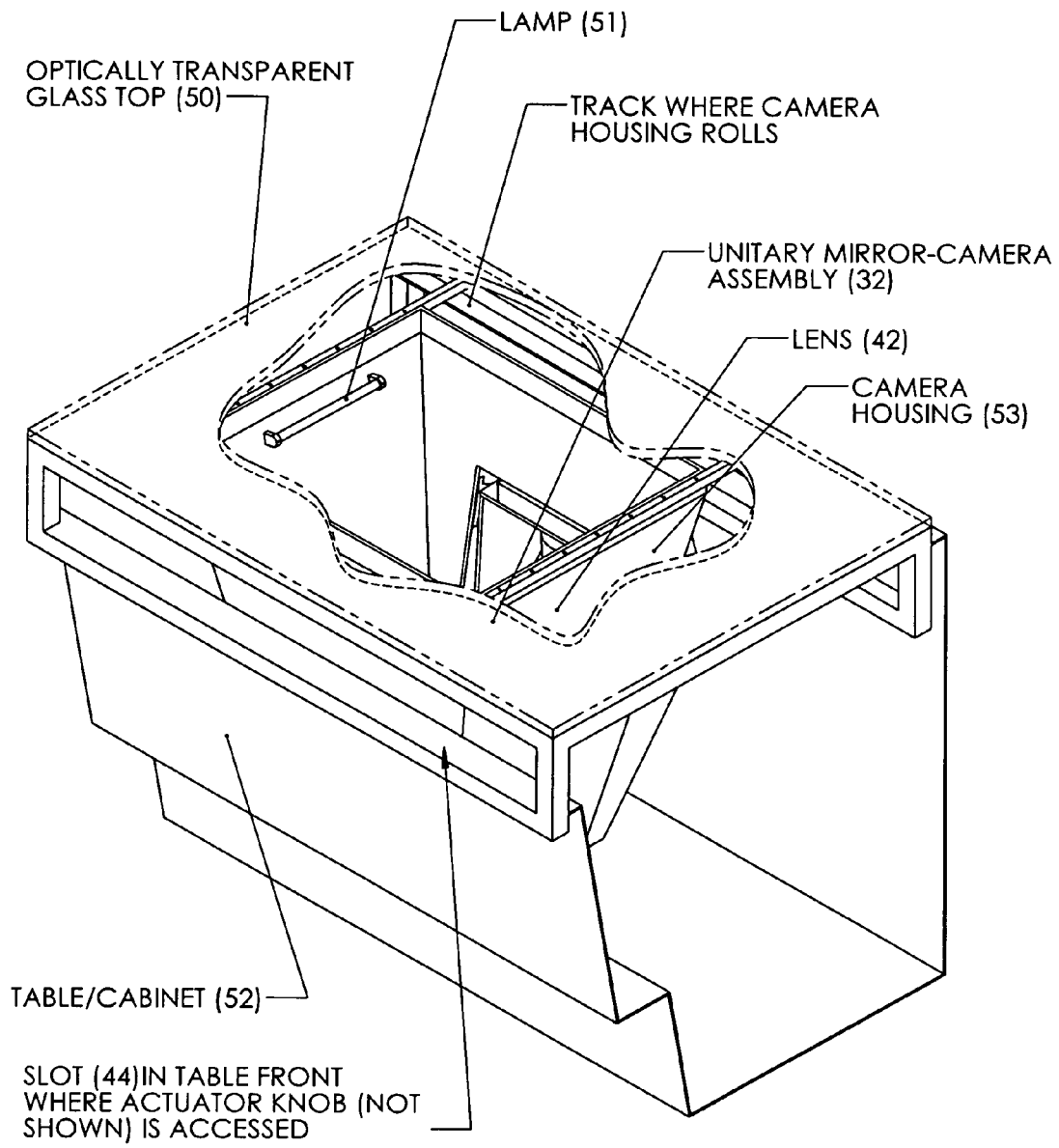
FIG. 9 is a view of a "full" camera resolution visual light document photography system, similar to what is shown in FIG. 7.

Finally, refer now to FIG. 9. Here is shown an alternate embodiment of a photographic system for taking "full" resolution photographs of larger or smaller regions of an image, say, that on the face of a document. The document might be a newspaper, page in a magazine, drawing or painting, a legal document, a map (old or new) or a photograph. The purpose for taking the photograph(s) of the document might be to archive it, enhance or restore it, reproduce all or just some part of it at the same or a different scale, or, to use it as the starting point for the creation of another document. To begin, note that FIG. 9 is outwardly very similar to FIG. 7, and by extension, to portions of each of FIGS. 3A-8C. What is different is essentially these two things: First, the table/cabinet 52 that carries the camera housing 31 has an optically transparent top, preferably of tempered glass. Various plastics might be suitable, but are not apt to be durable. Glass can be very strong, resistant to scratching and ill-treatment by harsh cleaning chemicals. Glass is also far less likely to turn cloudy or yellow with age. In keeping with the top of the table being optically transparent to visible light, note that the camera housing 53 has no top cover nor any scintillation screen. Thus, the unitary mirror-camera assembly 32 sees the document placed face down on the glass top 50. Second, illumination for the photograph is provided by one or more lamps 51 disposed on the inside of the camera housing, but such that the lamps themselves are outside the field of view of the camera.

It is, upon reflection, clear that the methods and various apparatus described herein are not limited to just two sizes, "large" and "small." "Intermediate" and "really small" come to mind as being potentially of use, depending upon the application. Since the camera housing is easily removed and replaced with another, a variety of "full" camera resolution imaging areas are readily available. While the lens for any particular imaging area size might stay with the camera housing, the camera back (with its expensive sensors) could well be removed (especially in the case where a telescoping focus is used, and the lens is not firmly connected to the camera body . . . ) and used in another housing, thus saving the expense of multiple cameras. Furthermore, it will be appreciated that the operation of the unitary lens-camera assembly can be altered to translate as well as rotate, thus giving rise to additional positions, while still having but two mirrors.

In connection with any of the embodiments associated with FIG. 3A through FIG. 9, we note the pleasing ease of use that is afforded. As is conventional with digital cameras, just a few seconds after the shot is taken (whether for x-ray or for photographing a document) the stored image is made available for some external system (e.g., a computer or a television screen) to display the captured image. This allows the operator the ability to reach an instant conclusion about the suitability of the shot just taken, and if a more desirable version is possible, simply re-shoot and take that one instead. The only cost for this convenience is actually the savings in time that it affords. There is no wasted film, toner or paper. It is perhaps worth noting that the x-ray embodiment needs to have focus adjustments performed. It turns out to be quite convenient to remove the scintillation screen from the camera housing carrying the mirror-camera assembly of interest and replace it with a thin sheet of glass or plastic covered by, for example, a page from a newspaper. (Newspaper is not particularly special, but it is inexpensive, readily available, large enough, and also thin so that it can be back-lit, and thus eliminate the need for illumination from within the camera housing during the focusing adjustments.)

I claim:

1. A method of photographing scintillation images originating from within larger and smaller scintillation imaging areas of a scintillation plane, the method comprising the steps of:
    (a) forming a first optical path for the larger scintillation imaging area by sequentially reflecting a scintillation image originating therefrom with first and second mirrors in respective first and second locations;
    (b) photographing, with a camera forming a moveable unitary assembly with the second mirror, the scintillation image after reflection by the second mirror in the second location;
    (c) forming a second optical path for the smaller scintillation imaging area and that is shorter than the first optical path, by locating the second mirror in a third location that intercepts a scintillation image originating at the smaller scintillation imaging area and before that scintillation image reaches the first mirror at the first location; and
    (d) photographing with the camera the scintillation image reflected by the second mirror in the third location.

2. A method as in claim 1 wherein steps (b) and (d) comprise the use of a digital camera.

3. A method as in claim 1 wherein steps (b) and (d) further comprise the step of changing the focus setting of a lens assembly that is attached at a fixed location onto a camera body.

4. A method as in claim 1 wherein step (b) further comprises the step of changing the focus of a lens assembly that is slidably attached onto a camera body by sliding the lens assembly closer to the camera body.

5. A method as in claim 1 wherein step (d) further comprises the step of changing the focus of a lens assembly that is slidably attached onto a camera body by sliding the lens assembly away from the camera body.

6. A method of maintaining increased camera resolution for the photographing of scintillation images originating from within larger and smaller scintillation imaging areas of a scintillation plane, the method comprising the steps of:
    (a) photographing a scintillation image within the larger scintillation imaging area using a first optical path formed through the use of steps comprising:
        (a1) reflecting the scintillation image within the larger scintillation imaging area with a planar first mirror to form an intermediate image;
        (a2) reflecting the intermediate image into a camera with a planar second mirror; and
        (a3) photographing with the camera the reflected intermediate image formed by the second mirror in step (a2); and
    (b) photographing a scintillation image within the smaller scintillation imaging area using a second optical path shorter than the first optical path and formed through the use of steps comprising:
        (b1) rotating the camera and the second mirror as a unit about an axis parallel to a line formed by intersecting the plane of the first mirror with the scintillation plane;
        (b2) intercepting the scintillation image within the smaller scintillation imaging area with the second mirror before that image reaches the first mirror; and
        (b3) photographing with the camera the reflected intercepted image formed by the second mirror in step (b2).

7. A method as in claim 6 wherein steps (a3) and (b3) comprise the use of a digital camera.

8. A method as in claim 6 wherein steps (a3) and (b3) further comprise the step of changing the focus setting of a lens assembly that is attached at a fixed location onto a camera body.

9. A method as in claim 6 wherein step (a3) further comprises the step of changing the focus of a lens assembly that is slidably attached onto a camera body by sliding the lens assembly closer to the camera body.

10. A method as in claim 6 wherein step (b3) further comprises the step of changing the focus of a lens assembly that is slidably attached onto a camera body by sliding the lens assembly away from the camera body.

* * * * *